Aug. 27, 1929.  W. B. CHURCHER  1,726,424
ELECTROMAGNETIC RELAY
Filed Jan. 29, 1926
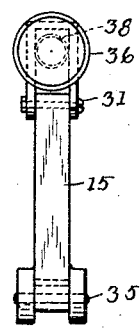
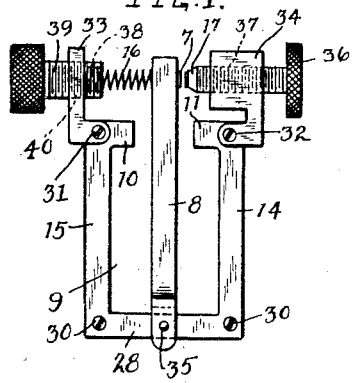
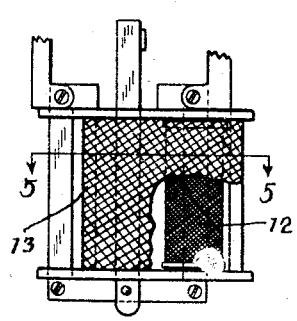
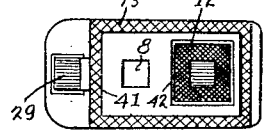
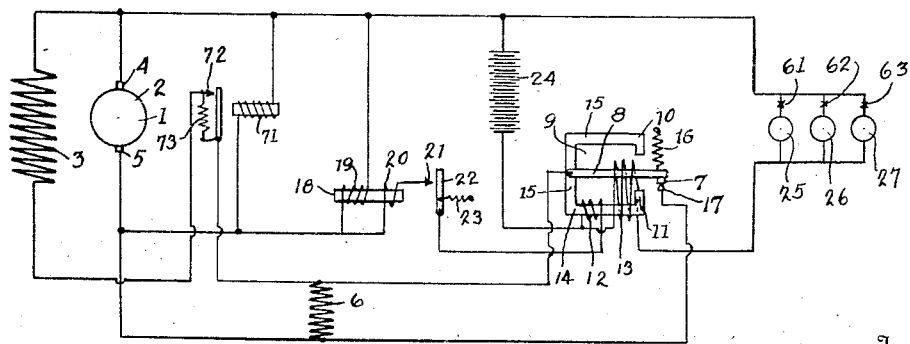
Inventor
William B. Churcher
By Frank M. Slough
His Attorney Patented Aug. 27, 1929.

1,726,424

UNITED STATES PATENT OFFICE.

WILLIAM B. CHURCHER, OF CLEVELAND, OHIO, ASSIGNOR TO THE WHITE MOTOR COMPANY, A CORPORATION OF OHIO.

ELECTROMAGNETIC RELAY.

Application filed January 29, 1926. Serial No. 84,636.

My invention relates to electromagnetic relays and relates particularly to electromagnetic relays having a plurality of windings, each adapted to receive energizing current varying from the current in the other winding.

My present invention has a particular application in electric systems for the charging of storage batteries, and particularly in such systems of the device applicable to be installed on motor vehicles, for the purpose of charging the storage battery carried by the vehicle, by means of an engine driven generator, which generator may be operated at varying speeds. In such systems, it is a common condition to have a very high discharge rate from the storage battery for considerable periods, and during part of which periods the motor vehicle is operated at a low speed or is at a standstill. In systems of the above type, now commonly in use, the charging of the storage battery is improperly regulated and the storage battery is injured by being overcharged during certain periods and undercharged at other periods, either or both of which having a very deleterious effect upon the life of the storage battery.

An object of my invention, therefore, is to provide an electromagnetic relay device, which, while capable of being applied to various types of electrical systems, has a particular use in an electrical system for a motor vehicle of the different types, which will operate to so govern the charging rate to the storage battery that substantially the proper amount of current will be supplied to the storage battery at all times, the relay so operating under the varying conditions met in practice that the rate of charging current delivered to the storage battery will be such as to keep the storage battery properly charged and without injuring the same.

Another object of my invention is to provide an electromagnetic relay of a highly efficient type, comprising an armature whose action can be controlled in a predetermined way, according to the varying currents flowing through a plurality of the relay windings.

Another object of my invention is to provide a relay having a plurality of windings of a highly efficient type, which is simple in construction and which may be manufactured commercially in qualitites with substantial uniformity of operation in the different specimens of the resultant product.

Other objects of my invention and the invention itself will be apparent from the description of an embodiment thereof, which follows, and in which description reference is had to the accompanying drawings.

Referring to the drawings illustrating an embodiment of my invention:

Fig. 1 shows a relay frame, in side elevation, comprising cores, an armature and an electrical contact set, the windings not being herein illustrated;

Fig. 2 shows a side elevation of the relay of Fig. 1;

Fig. 3 shows a plan view of the relay of the foregoing figures;

Fig. 4 shows a portion of the relay of Fig. 1, relay windings being added to the frame, a portion of an outer one of the said windings being illustrated as being broken away to reveal an underlying winding;

Fig. 5 is a section on the line 5—5 of Fig. 4; and

Fig. 6 shows, diagrammatically, an electrical system in which is incorporated the relay of my invention, to illustrate a use to which the relay of my invention may be put and to further illustrate the disposition of the windings relative to the cores and armature.

Referring now to Figs. 1 to 5 of the drawings, in all of which like parts are designated by like reference characters, I show an embodiment of my invention comprising a relay 9 having a U-shaped electromagnetic core structure comprising a plurality of sheet iron stampings bolted together by virtue of bolts 30 at the lower portions thereof and by bolts 31 and 32, the latter bolts securing to the core extremity relay armature control supports 33 and 34. The relay core 28 has upwardly extending arms 14 and 16 terminating in magnetic poles 11 and 10, respectively, pivoted at a midpoint in the core 28. At 35 I mount an armature 8 of iron or like magnetic material adapted to play between the poles 10 and 11 to open or close a set of relay contacts 7 comprising stationary contact 17, the stationary contact being mounted on the end of adjusting screw 36 screw-threaded through the support 34 and capable of being reciprocated through an opening 37 through said support toward the movable contact of the seat so as to limit the movement of the armature necessary to close the contacts.

As best shown in Fig. 5 at 16 I show an armature compression spring preferably seated within a recess 38 in an adjusting screw 39, screw-threaded through an opening 40 in the support 33 and adapted to be reciprocated through said opening to increase or decrease the tension of the spring 16. Axially disposed on the electromagnet core arm 14, I provide an electromagnetic energizing winding 12, and over the winding 12 and over the armature 8, I place a winding 13 with a sufficient space between the armature 8 and the inside wall of the winding 13 that the armature 8 may be movable between the side 42 of the coil 12 and the inside wall 41 of the winding 13 so as to open or close the contacts 7 in response to energization of the current windings of the relay.

The system illustrated in Fig. 6, in which the relay of my invention may be advantageously employed, operates as follows, considering for the purpose of example only a given set of values of current flow and a given set of conditions causing such current flow.

Whenever the motor vehicle carrying such a system is operated below a flow of 20 amperes in the charging circuit of the generator, that is, when the motor vehicle is being operated at very low rates of speed, the contact 7 will remain closed, the spring 16 exerting sufficient tension to overcome such low demagnetizations of the magnetic cores 14 and 8 as would open the contacts, in view of the low values of current passing thru the winding 12 at low charging rates. Whenever the generator charging rate is sufficiently high, such as when the motor bus is operating at a high speed, there being considered to be up to this point no load on the storage battery 24, or a negligible load thereon, the energization of the relay core consequent upon the passing of current in excess of 20 amperes through the winding 12, will be sufficient to open the contact 7 of the relay to reduce the charging rate. However, whenever under such conditions a sufficient number of current-consuming devices, such as the devices 25, 26 and 27, are included in circuit by means of the operation of electrical switches, such as 61, 62 and 63, to withdraw a considerable amount of current from the storage battery 24, or from the generator 2 so that the net charging current effective to charge the battery 24 will be considerably reduced, such load current passes through the winding 13 of the relay 9 to neutralize to a degree the effect of the current through the winding 12, and if the current through the winding 12 is not sufficiently great to supply the load in addition to supplying a sufficient charging current to the storage battery, the magnetic effect of such energization of the winding 13 will be to cause an attraction upon the armature 8 by the pole piece 10 of the relay opposing the attraction of the pole piece 11 and the armature 8 will be retracted assisted by the spring 16 to reclose the contact 7 at which time the charging rate of the generator will be increased, since a shunt resistance 6 in the circuit of the energizing field 3, will be shunted by the contact seat; additional current passing through the field 3 as a result thereof will cause the generator 1 to deliver a higher current to the system, the ultimate result being that notwithstanding the load placed on the system by the inclusion of the current consuming devices 25, 26 and 27 therein, the storage battery charging rate 24 will be sufficiently maintained by augmented current from the generator 1. Whenever no charging of the storage battery 24 occurs, and whether or not the current-consuming devices 25 to 27 are being energized from the storage battery 24, the contact seat 7 will be closed, and will remain closed until the charging rate from the generator when charging is started reaches a predetermined value.

I preferably provide, in the system illustrated, a voltage regulator for the generator 1 to prevent the generator voltage from reaching an axcessive value. This may take the form of a relay having a winding 71 connected across the terminals of the generator brushes 4 and 5 and having normally made contacts 72 shunting a resistance 73 in the circuit of the field coil 3 of the generator. The arrangement is such that whenever the generator voltage reaches a predetermined high value, the energization of the winding 71 will become sufficient to attract the armature of the relay to break the contact 72 and to thereby include in the circuit of the field coil 3 the resistance coil 73 to cut down the flow of current through such field winding 3. This results in the voltage of the generator being immediately lowered and consequently in the operation of the system, the relay is operated intermittently, the armature often vibrated to open and close the contact 72 for such periods as will maintain the generator voltage at a value, which is not excessive and which may be varied by the adjustment of the relay.

Having now described my invention in a particular embodiment, I am aware that numerous and extensive departures may be made from the embodiment illustrated and described, but without departing from the spirit of my invention.

What I claim is:

1. In an electrical relay, a tri-polar core, two of the poles thereof being stationary and the third being an armature pole positioned so as to be differentially moved by the magnetic fields set up in the first two poles, a first magnetizing winding on a first one of said stationary poles and a second winding disposed over the first winding and the armature pole.

2. In an electrical relay, a tri-polar core, two of the poles thereof being stationary and the third being an armature pole positioned so as to be differentially moved by the magnetic fields set up in the first two poles, a first magnetizing winding on a first one of said stationary poles and a second winding disposed so as to magnetize the armature pole and said first pole to substantially the same degree and like polarity, said second winding comprising a plurality of turns of wire enclosing together the armature and the first winding and providing within the said turns a space within which the armature may be moved.

3. In an electrical relay, the combination with an armature, of a relay core, of a return pole piece, said core, armature and pole piece being magnetically joined at an end of each, a pair of relay windings, one of said windings being applied around the said core, a second of the said windings being applied around said core and said armature, said windings being adapted to be simultaneously energized by currents flowing through the windings, said second winding reenforcing the magnetic effect of the first winding upon the core and at the same time opposing the magnetic effect of the first winding upon the armature, said second winding at the same time reenforcing the magnetic effect of the first winding upon the pole piece, said armature adapted to vibrate between the non-joined ends of said core and pole piece.

4. In an electrical relay, the combination with an armature, of a relay core, of a return pole piece, said core, armature and pole piece being magnetically joined at an end of each, a pair of relay windings, one of said windings being applied around the said core, a second of the said windings being applied around said core and said armature, said windings being adapted to be simultaneously energized by currents flowing through the windings, said second winding reenforcing the magnetic effect of the first winding upon the core and at the same time opposing the magnetic effect of the first winding upon the armature, said second winding at the same time reenforcing the magnetic effect of the first winding upon the pole piece, said armature adapted to vibrate between the non-joined ends of said core and pole piece, and spring means adapted to bias the armature toward one of its ultimate positions.

In testimony whereof I hereunto affix my signature this 29th day of December, 1925.

WILLIAM B. CHURCHER.